United States Patent
Sauer

(10) Patent No.: US 7,533,919 B2
(45) Date of Patent: May 19, 2009

(54) STORAGE COMPARTMENT FOR A MOTOR VEHICLE, GLOVE COMPARTMENT AND DASH BOARD

(75) Inventor: Rolf Sauer, Oberhausen-Rheinhausen (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 12/095,141

(22) PCT Filed: Nov. 29, 2006

(86) PCT No.: PCT/EP2006/069058

§ 371 (c)(1),
(2), (4) Date: Jul. 25, 2008

(87) PCT Pub. No.: WO2007/063074

PCT Pub. Date: Jun. 7, 2007

(65) Prior Publication Data

US 2008/0290682 A1    Nov. 27, 2008

(30) Foreign Application Priority Data

Nov. 29, 2005  (DE) .................. 10 2005 057 188
Nov. 29, 2005  (DE) .................. 10 2005 057 189
Nov. 29, 2005  (DE) .................. 10 2005 057 215

(51) Int. Cl.
*B60R 7/06* (2006.01)

(52) U.S. Cl. .................................. 296/37.12

(58) Field of Classification Search ............ 296/37.12, 296/37.8, 37.1
See application file for complete search history.

(56) References Cited

U.S. PATENT DOCUMENTS

| 1,048,525 | A | 12/1912 | Goding |
| 5,071,162 | A | 12/1991 | Takagawa |
| 5,197,755 | A | 3/1993 | Quick |
| 2003/0178434 | A1 | 9/2003 | Kato |

FOREIGN PATENT DOCUMENTS

| DE | 3432799 | 4/1985 |
| DE | 199 30 059 | 1/2001 |
| EP | 0 668 189 | 8/1995 |
| EP | 1 048 525 | 11/2000 |
| EP | 1 193 129 | 4/2002 |

OTHER PUBLICATIONS

English Translation of International Preliminary Report on Patentability for PCT/EP2006/069058.
International Prelim Report on Patentability for PCT/EP2006/069058.
International Search Report for PCT/EP2006/069058.
Written Opinion on Patentability for PCT/EP2006/069058.

*Primary Examiner*—Joseph D Pape
(74) *Attorney, Agent, or Firm*—Martin Fleit; Paul Bianco; Fleit Gibbons Gutman Bongini & Blanco PL

(57) ABSTRACT

The invention relates to a glove compartment for a motor vehicle, comprising a first storage compartment (106), separate from a second storage compartment (108), and a first cover (110) for covering the first storage compartment and a second cover (114) for covering the second storage compartment, the first cover being configured in such a manner as to conceal a joint (121) between the first and the second cover.

14 Claims, 10 Drawing Sheets

STORAGE COMPARTMENT FOR A MOTOR VEHICLE, GLOVE COMPARTMENT AND DASH BOARD

FIELD OF THE INVENTION

The present invention relates to a storage compartment for motor vehicles, namely a glove compartment, as well as a dashboard with a glove compartment.

BACKGROUND OF THE INVENTION

From the state of the art, various storage compartments for motor vehicles are known. In particular, from EP 0 668 189 B1, a dashboard for a motor vehicle is known, which includes two storage spaces that are concealed by corresponding covers. The covers can pivot upward or downward. Glove compartments are known from, among others, DE 3432799 C2, EP 1 193 129 A1, EP 1 048 525 A1, and DE 199 30 059 A1.

In contrast, the invention is based on the task of creating an improved storage compartment for a motor vehicle, namely a glove compartment, as well as an improved dashboard with a glove compartment.

The tasks forming the basis of the invention are each solved with the features of the independent claims. Preferred embodiments of the invention are specified in the dependent claims.

SUMMARY OF THE INVENTION

According to the invention, a storage compartment for a motor vehicle is created, which includes at least first and second storage spaces. The two storage spaces are concealed by corresponding covers. A joint between the covers is covered by one of the covers. Through the ability to countersink the upper cover, the risk of injury is reduced in case an accident occurs while the upper cover is opened. In this respect, the upper cover is especially critical because it is located in or close to the head impact area of the passenger. The opened lower cover is less relevant in terms of injury during an accident because it is located in the knee impact area. In particular, the lower cover can be snapped shut when an accident occurs by means of the passenger pushing against the lower cover with his knees. The lower cover can then act as an impact surface. Thus, an embodiment in which only the upper cover can be completely or partially countersunk is especially preferred, whereas the lower cover can pivot upward into the interior of the vehicle, so that it can swing shut during an accident and it then acts as an impact surface. The invention thus allows the combination of an esthetically pleasing shape of the glove compartment with increased safety and convenient storage function.

This has the advantage that double adaptation of the cover can be avoided, by means of which the tolerance situation between the two covers can be made easier. Covering the joint by one of the two covers further allows an improved design of the storage compartment or the vehicle interior.

In one embodiment of the invention, one of the covers is configured in such a way that it conceals the joint viewed from a sitting position in the interior of the vehicle.

In one embodiment of the invention, the storage spaces are arranged one above the other. The lower edge of the upper cover is here arranged in front of the upper edge of the lower cover relative to the sitting position in the interior of the vehicle. In this way, the upper edge of the lower cover is concealed viewed from the sitting position.

In one embodiment of the invention, the upper cover extends past a separating wall of the storage spaces. Through the region of the upper cover extending past the separating wall, an upper region of the lower cover and thus a joint between the covers is concealed.

In one embodiment of the invention, the covers are coupled with each other in such a way that when one of the covers is opened, the other cover is similarly opened.

This has the advantage that, on one hand, the storage space is divided into two storage spaces, so that different objects can be sorted in the storage spaces, and, on the other hand, both storage spaces are accessible through a single user action, in that, namely either only one or the other of the two covers is activated.

In this way it can be prevented, in particular, that one user must open the two covers separately one after the other when he or she wants to look for and remove a certain object in the storage spaces.

The covers can be coupled in different ways. For example, the coupling of the covers can be realized mechanically, in particular, by means of a lever mechanism. Alternatively or additionally, the coupling can be realized electromechanically. Here, by activating one of the two covers, an actuator, such as, for example, an electric motor, can be turned on, which drives the other cover or both covers, in order to open the cover or covers.

Alternatively or additionally, the covers can also be coupled electronically. In this way, an activation of one of the two covers is sensed by the user. This generates a control signal through which one or more actuators, in particular, electric motors are controlled, in order to open the two covers. For the input of an opening command for opening the two covers, a switch, for example, a pressure switch, non-contact switch, for example, a capacitive or inductive proximity sensor, or the like, can be arranged on one or two of the covers or on the dashboard. The activation of such a switch is sensed by a control device, for example, a so-called electronic control unit (ECU), so that the ECU controls one or more actuators, so that the covers are opened.

The coupling of the covers can be constructed in such a way that the closing of the covers can be realized independent of each other, for example, through manual closing of the covers. The coupling of the covers can also be constructed in such a way that by closing one of the covers, the other cover is automatically also closed. The necessary coupling of the covers can be constructed, in turn, mechanically, electromechanically, and/or electronically.

In one embodiment of the invention, the covers are coupled with each other in such a way that the covers are opened and/or closed essentially in sync.

In one embodiment of the invention, one of the storage spaces is arranged above the other storage space in an installed position of the storage compartment. The cover concealing the upper storage space is here constructed in such a way that it conceals a joint between the covers in its closed position.

In one embodiment of the invention, only the lower cover has an activation handle. The activation of the upper cover can be realized in such a way that a user pulls on an edge of the upper cover concealing the joint between the covers.

In one embodiment of the invention, an essentially horizontal separating wall in the installed position runs between the two storage spaces. Advantageously, the upper of the two covers conceals the separating wall when it is closed.

In one embodiment of the invention, the two covers are coupled mechanically by means of a lever. The lever has an axle, which is supported so that it can pivot with respect to a housing of the storage compartment.

In one embodiment of the invention, the mechanical coupling has another lever, which attaches to the pivoting lever.

In another embodiment, the pivoting support of the axle of the lever named first is realized by another lever, which is mounted on its side by means of a pivot axle on the housing of the storage compartment.

In one embodiment of the invention, the third lever has a stop face for limiting the pivoting motion.

The mechanical coupling of the covers with the help of one or more levers has the advantage that this can be realized with a robust construction and with relatively little expense.

According to one embodiment of the invention, the storage compartment provides a glove compartment.

In another aspect, the invention relates to a dashboard with an integrated storage compartment according to the invention.

In one embodiment of the invention, the coupling of the covers covering the storage compartment is realized mechanically, for example, by means of one or more levers, electromechanically, and/or electronically.

In another embodiment, the coupling between the covers is interrupted or such a coupling is not present. One of the two storage spaces includes an energy absorption body for absorbing impact energy. For example, the lower of the two storage spaces includes such an energy absorption body for knee impact protection, i.e., as a so-called knee pad. The energy absorption body can be made, for example, from a foam material, a foam composite, a honeycomb-shaped structure, or the like.

In the embodiment with energy absorption bodies, the corresponding cover, which conceals the storage space including the energy absorption body, is connected rigidly to a housing of the storage compartment and/or the dashboard.

This is especially advantageous for realizing various variants of a motor vehicle model with or without a passenger knee pad, because the same or essentially the same design of the dashboard can be used independent of the presence or absence of the knee pad. In the variant with an energy absorption body, in particular, a knee pad, there is no coupling between the covers. The cover, which conceals the storage space including the energy absorption body, is connected rigidly to the dashboard. This cover acts as the impact surface for absorbing energy during a frontal impact.

The realization of the different variants of a motor vehicle model with or without a knee pad while maintaining the same outer design of the dashboard is especially advantageous for the realization of different country variants of the motor vehicle model, because in a few countries, knee pads are regulated by law, as well as also to provide various equipment options according to customer wishes.

In another embodiment of the invention, at least one of the two covers can be countersunk. When the relevant cover is opened, it pivots or moves back partially or advantageously completely behind the surface of the dashboard. In this way, the risk of injury can be minimized during a motor vehicle accident, especially during a frontal impact.

In particular, in this way injuries on an opened cover projecting into the interior of the vehicle can be prevented. For example, it can be prevented that an opened cover projecting into the interior of the vehicle can be detached or damaged by the airbag. Covers, parts of covers, or particles of the cover that have become detached could represent, under some circumstances, a risk of injury for the vehicle occupants.

Furthermore, in this way it can also be prevented that an airbag deployed due to the impact completely or partially closes the opened cover due to its unfolding movement, wherein body parts could become stuck.

In another aspect, the invention relates to a dashboard with a storage compartment, in particular, with a glove compartment. The glove compartment has, for example, two covers, which are arranged one above the other and which can be opened in opposite directional senses. The joint formed between the covers is concealed by the upper of the two covers.

Opening and closing the covers can be realized with a rotating, pivoting, and/or translating motion. Advantageously, when opened, the upper cover is countersunk partially or completely in the dashboard, so that the opened upper cover does not or almost does not project into the interior of the motor vehicle.

In the lower storage compartment of the glove compartment, an energy absorption body can be arranged. In this case, the lower cover cannot be opened, that is, it is connected rigidly to the housing of the glove compartment and/or to the dashboard.

Instead, with two separate covers, the storage spaces in the storage compartment can also be concealed with a single cover, whose outer contour corresponds to the contour of the two separate covers each in their closed position. Here, optionally, the separating wall that separates the two storage spaces from each other can also be eliminated.

BRIEF DESCRIPTION OF THE DRAWINGS

The present invention thus creates a glove compartment module system, which offers various equipment variants, each with the same or essentially the same outer appearance as the storage compartment, in particular, the glove compartment or the dashboard.

Furthermore, various embodiments of the invention will be explained in more detail with reference to the drawings. Shown are.

DETAILED DESCRIPTION OF THE INVENTION

Elements corresponding to each other in the subsequent description of the figures are characterized with the same reference symbols.

Figure 1:
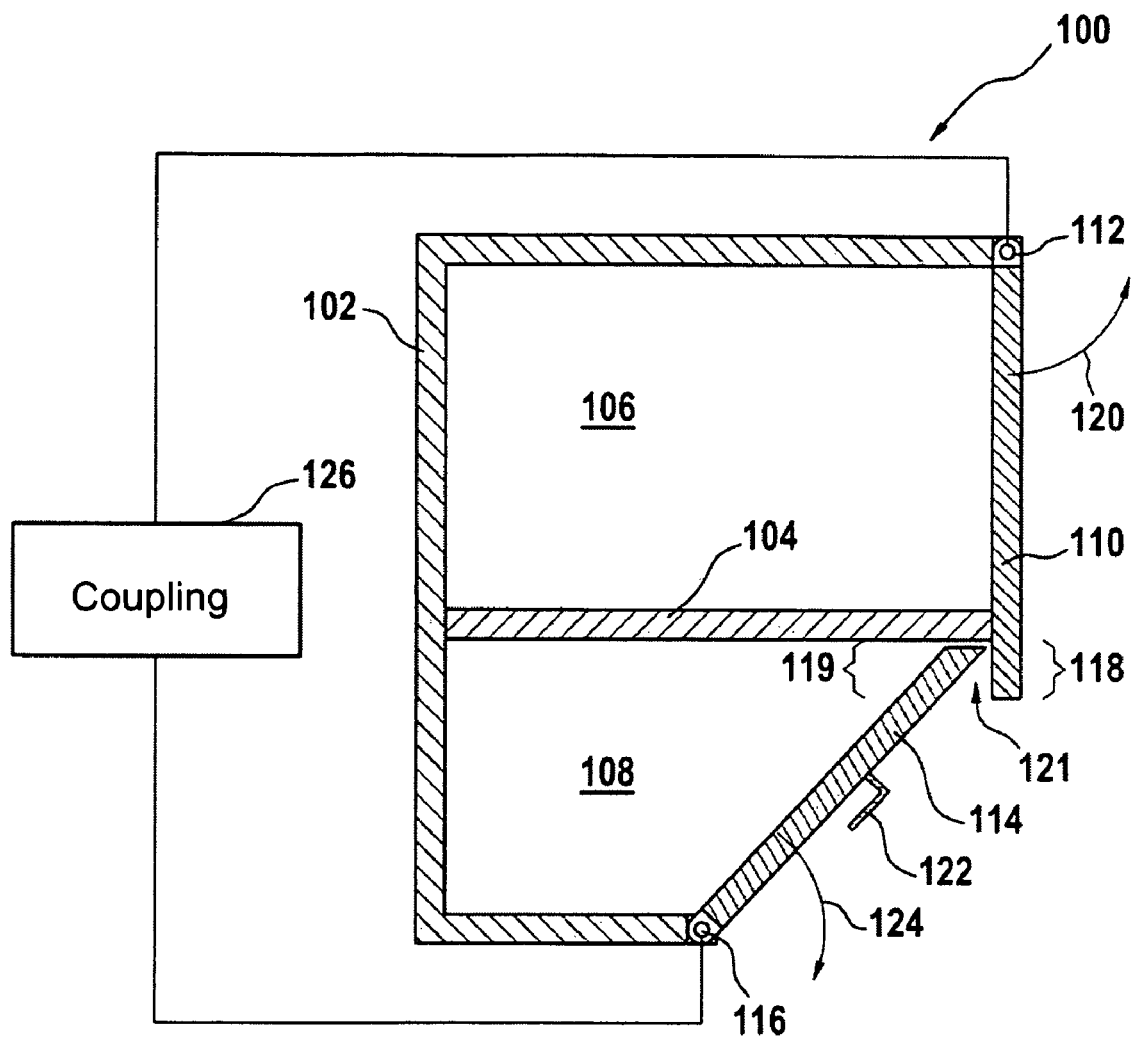
FIG. 1, a schematic section view of an embodiment of a storage compartment according to the invention, FIG. 2, a perspective view of an embodiment of a storage compartment according to the invention with mechanical coupling of the cover, FIG. 3, the view of FIG. 2 for opened covers, FIG. 4, a side view of an embodiment of a dashboard according to the invention with a glove compartment, FIG. 5, a perspective view of the dashboard from the interior of the motor vehicle for opened covers, FIG. 6, a side view of an equipment variant of the embodiment shown in FIG. 4 with knee impact protection, FIG. 7, the view of FIG. 5 in the equipment variant with knee impact protection, FIG. 8, a perspective view of an equipment variant of the dashboard with a single cover, FIG. 9, a perspective view of an equipment variant of the dashboard according to FIG. 8 with a single storage compartment, FIG. 10, a perspective view of a rotating bearing for the upper cover for countersinking in the dashboard, FIG. 11, a perspective view of a drive device with a connecting rod guide for the upper cover, FIG. 12, a schematic side view of another embodiment of a glove compartment according to the invention.

FIG. 1 shows a storage compartment 100 for a motor vehicle, for example, a glove compartment or the like. The storage compartment 100 has a housing 102, which is divided by a separating wall 104 into an upper storage space 106 and a lower storage space 108. In the embodiment considered here, in its installed position, the separating wall 104 runs essentially in the horizontal direction.

A cover 110 is supported on the housing 102 so that it can pivot upward about an axle 112. In its closed position shown in FIG. 1, the cover 110 conceals the storage compartment 106.

Another cover 114 of the storage compartment 100 is supported so that it can pivot downward about an axle 116 on the housing 102. In its closed position shown in FIG. 1, the cover 114 conceals the lower storage space 108.

In the embodiment considered here, the cover 110 extends past the separating wall 104. In this way, an edge region 118 is formed on the cover 110. A user can easily grip the cover 110 in the edge region 118 in order to pivot this upward in the pivoting direction 120. The edge region conceals the region 119 of the cover 114 that lies behind when the covers 110, 114 are closed viewed from the interior of the vehicle and that forms a joint 121 with the other cover 110.

The lower cover 114 can have an activation handle 122. By pulling on the activation handle 122, a user can pivot the lower cover 114 downward in the pivoting direction 124.

The two covers 110 and 114 can be coupled with each other by means of a coupling 126, so that, for opening one of the two covers, the other cover is similarly opened. The coupling 126 can be constructed in such a way that the same also applies for the closing of the covers 110, 114, that is, when closing one of the covers, the other cover is automatically also closed.

For this purpose, the coupling 126 can be constructed mechanically, electromechanically, and/or electronically.

In the embodiment considered here, the coupling 126 is constructed so that when the covers 110, 114 are closed, the cover 114 leads the cover 110, so that the cover 144 [sic; 114] has reached its closed position shown in FIG. 1 before the cover 110 reaches its closed position shown in FIG. 1. In this way, it is prevented that the covers 110, 144 impact each other with the outer edges shortly before reaching their respective closed position.

Figure 2:
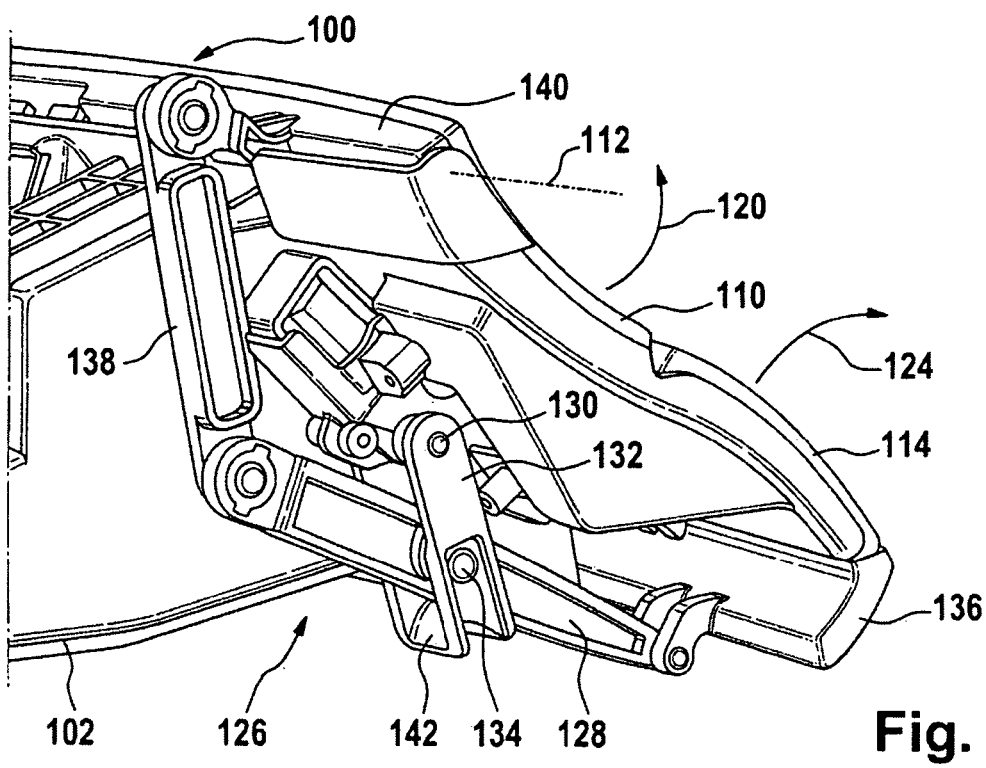

In a perspective view, FIG. 2 shows a mechanical construction of the coupling 126 with the help of a lever mechanism.

The coupling 126 has, in the embodiment of FIG. 2, a lever 128. The lever 128 is supported so that it can pivot about an axle 130 mounted on the housing 102. For this purpose, the axle 130 holds another lever 132, which has two opposing legs, through which the lever 128 runs. The lever 128 is connected to the lever 132 with an axle 134 running between the opposing legs of the lever 132.

One end of the lever 128 is connected to a bottom region 136 of the lower cover 114 so that it can pivot. On the other end of the lever 128, another lever 138 is supported so that it can pivot. The other end of the lever 138 is connected to an upper region 140 of the upper cover 110 so that it can pivot.

In the embodiment of FIG. 2, the lever 132 has on its end opposite the axle 130 a stop face 142, which connects the two opposing legs of the lever 132 to each other. The stop face 142 has a curved profile. A pivoting motion of the lever 128 about the axle 134 for opening or closing the covers 110 and 114 is limited by the stop face 142.

For opening the covers 110 and 114, a user activates one of the two covers, in that he or she grips, for example, the cover 110 at the edge region 118 and pulls it upward, or in that he or she pulls the cover 114 downward in the pivoting direction 124 with the help of the activation handle 122.

When the activation force engages the upper cover 110 in order to pivot this in the pivot direction 120, the activation force is transferred via the lever 138 to the lever 128, so that this executes a pivoting motion about its axle 134 and about the axle 130, which is limited by the stop face 142. In this way, the lower cover 114 is opened in the pivot direction 124.

In contrast, if the activation force engages the lower cover 114 in order to open this in the pivot direction 124, then the activation force is transferred via the lever 128 and the lever 138 to the upper cover 110, so that this pivots in the pivot direction 120, wherein the lever 128, in turn, executes pivoting motions about the axles 134 and 130, which are limited by the stop face 142.

Figure 3:
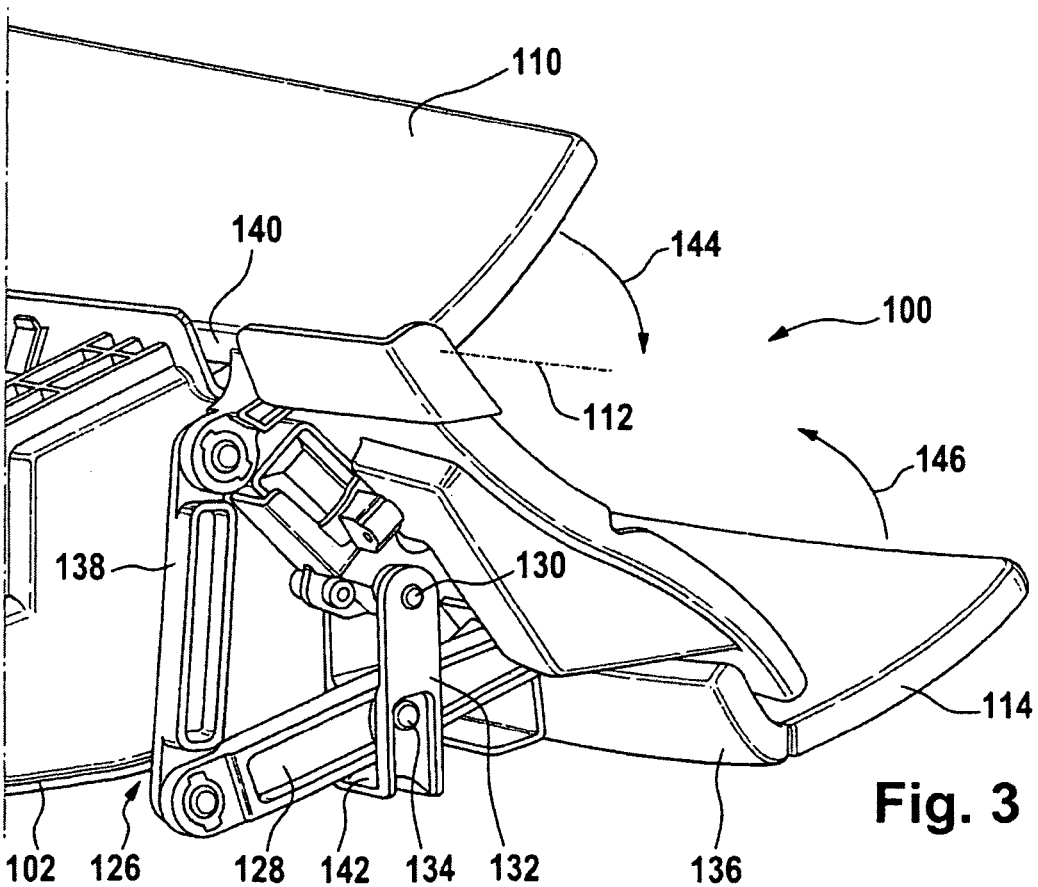

FIG. 3 shows the position of the levers 128, 132, and 138 for opened covers 110 and 114.

For closing the covers 110 and 114, a corresponding process can be performed. For this purpose, a user can press the upper cover 110 downward in the pivot direction 144 or pull the cover 114 upward in the pivot direction 146. The corresponding closing forces are transferred via the coupling 126 from the activated cover to the other cover.

Figure 4:
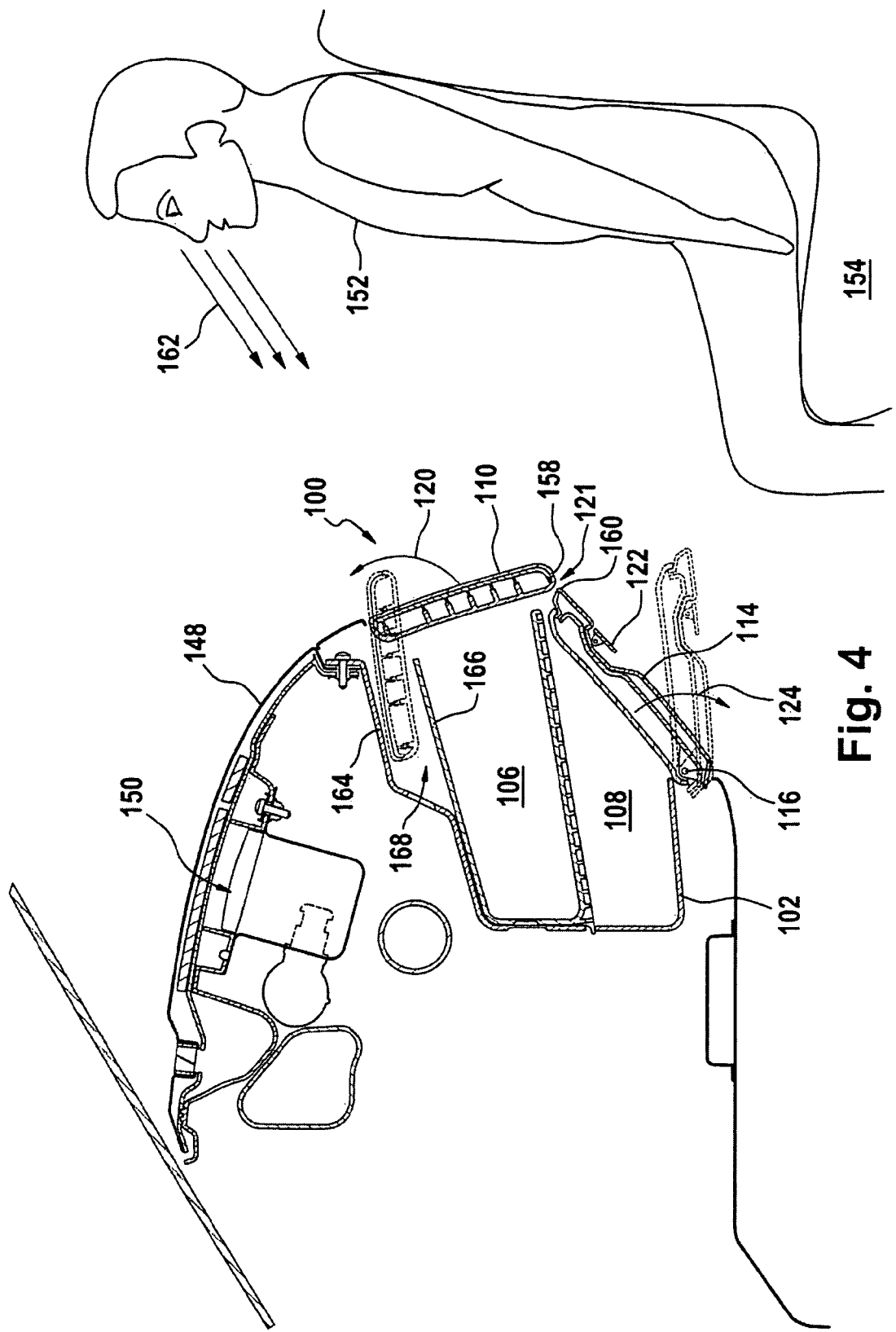

FIG. 4 shows a cross section of a dashboard 148 with a storage compartment 100. The storage compartment 100 is arranged underneath a passenger airbag 150. The upper cover 110 of the storage compartment 100 extends past the separating wall 104, so that it conceals a joint 121 between the upper cover 110 and the lower cover 114. Due to this, the joint 121 is not visible for a passenger 152, when he is located in his normal sitting position on a passenger seat 154.

The upper cover 110 has a lower edge 158, which lies in front of an upper edge 160 of the lower cover 114 viewed from the direction of the passenger 152. Therefore, the cover 110 conceals the joint 121 formed between the lower edge 158 and the upper edge 160, so that this is invisible in the viewing direction 162 of the passenger 152, when the covers 110 and 114 are closed. In the embodiment considered here, a receiving region 168 for the cover 110 is formed between an upper wall 164 of the housing 102 and an upper limit 166 of the storage space 106. The receiving region 168 is located in the installed position of the storage compartment 100 in the interior of the dashboard 148.

When the cover 110 is opened, this is at least partially countersunk in the receiving region 168, as shown with dashed lines in FIG. 4. This can be realized by a rotating motion and/or a translating motion, as explained in more detail farther below with reference to the embodiments of FIGS. 10 and 11.

For opening the storage compartment 100, the passenger 152 grips the upper cover 110 in the region of its lower edge 158 and pulls the lower edge upward, wherein the cover 110 executes an opening motion, through which it is rotated or moved into the receiving region 168. If the two covers 110 and 114 are coupled with each other, the lower cover 114 opens through a pivoting motion into its opened position similarly shown with dashed lines in FIG. 4.

Alternatively, the opening of the two covers 110 and 114 coupled with each other can also be initiated by activating the activation handle 122.

For closing the covers 110 and 114, the passenger 152 can grip the cover 110 countersunk at least partially in the receiving region 168 in the region of its lower edge 158 and pull it out from the receiving region 168. For covers 110 and 114 coupled with each other, this leads simultaneously to the closing of the lower cover 114.

Alternatively, the passenger 152 can also close the two covers 110 and 114, if both are coupled with each other, in that he activates the lower cover 114. In this way, the upper cover 110 is rotated or moved out of its receiving region 168 into its closed position.

This embodiment is especially advantageous, because gripping the upper cover 110 in the region of its lower edge 158 can be associated with difficulties for the passenger 152, especially if the cover 110 has been completely countersunk into the receiving region 168. In this case, the closing of the upper cover 110 based on an activation of the lower cover 114 is advantageous.

Another advantage of the embodiment of FIG. 4 consists in that, due to the ability to at least partially countersink the cover 110 in the receiving region 168, it can be prevented that the passenger airbag 150 impacts the opened cover 110 when the airbag deploys, which could result in injuries.

Figure 5:
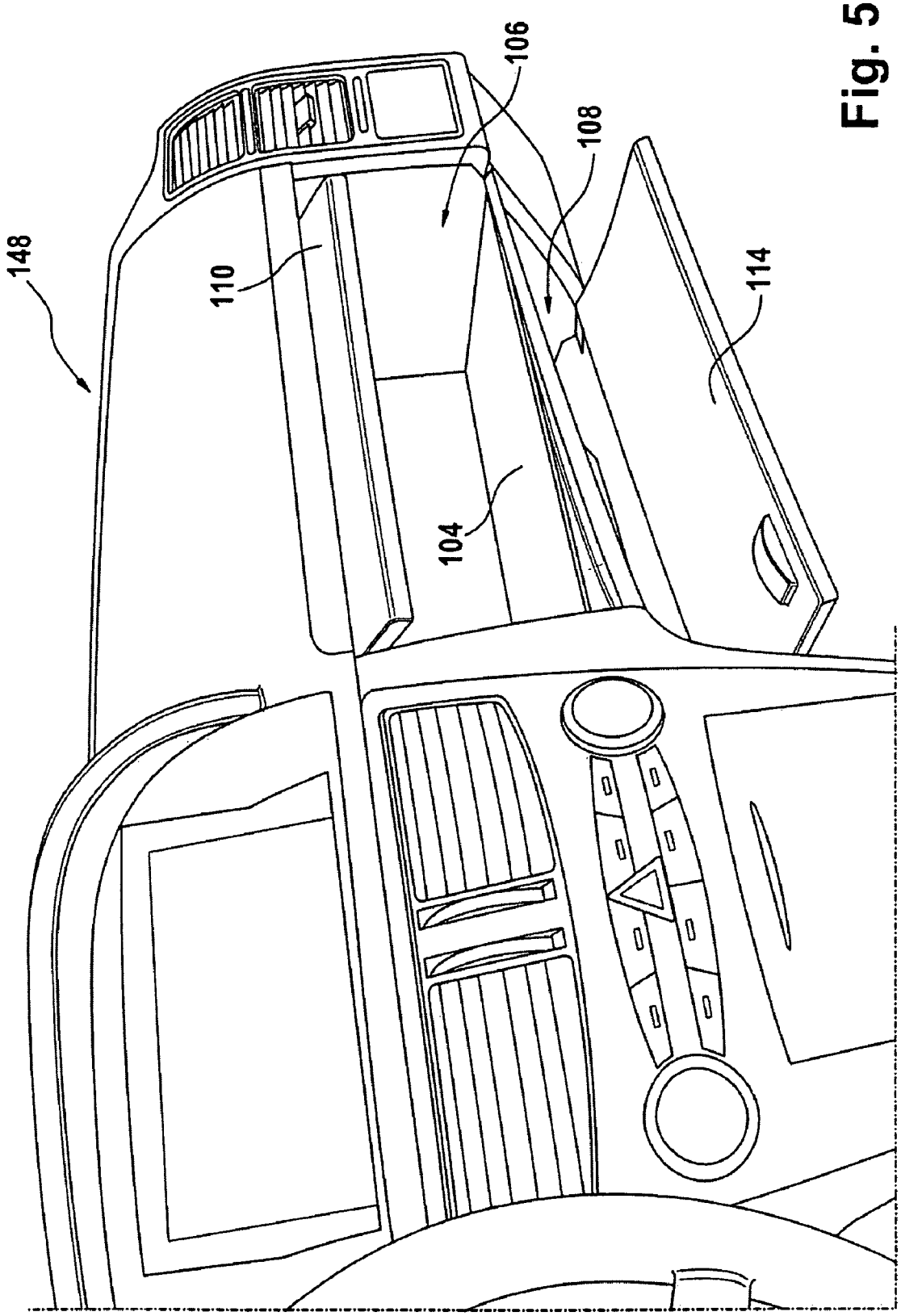

FIG. 5 shows the dashboard 148 in a perspective view from the interior of the vehicle, for opened covers 110 and 114. In the embodiment shown here, the storage compartment 100 is constructed as a divided glove compartment with two storage spaces 106 and 108 (cf. FIGS. 1 and 4) lying one above the other. In its shown open position, the upper cover 110 is almost completely countersunk in the dashboard 148.

Figure 6:
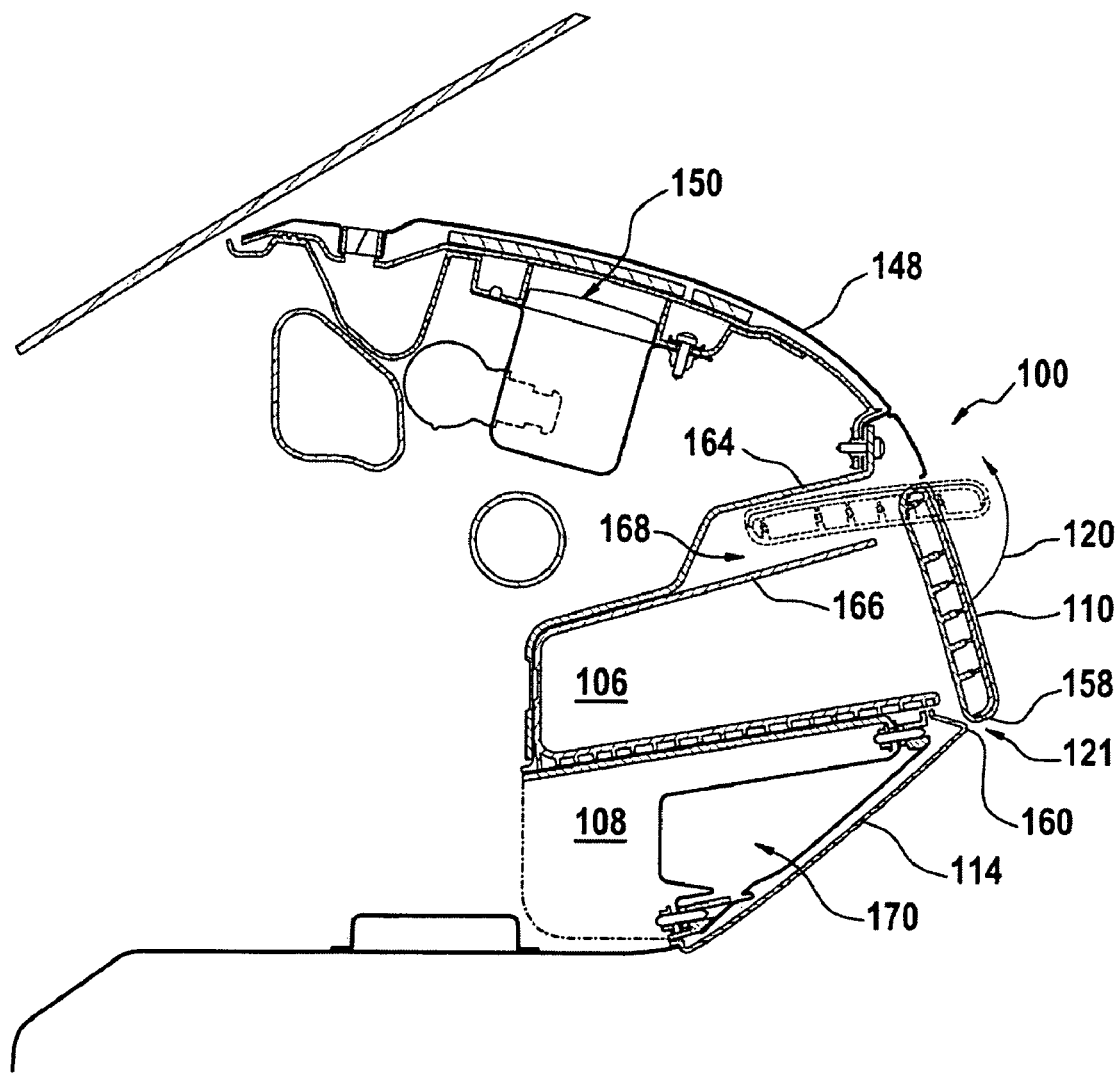

FIG. 6 shows an equipment variant of the embodiment shown in FIGS. 4 and 5. In this embodiment, an energy absorption body 170 is located in the lower storage space 108. An impact surface mounted in front of the energy absorption body 170 is formed by the lower cover 114. In this embodiment, the cover 114 is not to open, but instead is connected rigidly to the dashboard 148.

Through the energy absorption body 170 and the front-mounted cover 114, knee impact protection, that is, a so-called knee pad, is created. The outer contour of the dashboard 148 is here essentially identical to the outer contour in the embodiment of FIG. 4 with the difference that the activation handle 122 is eliminated, because the lower cover 114 cannot be opened.

The energy absorption body 170 can be made, for example, from a foam material or a foam composite material and/or can have a honeycomb-shaped structure for absorbing energy.

Figure 7:
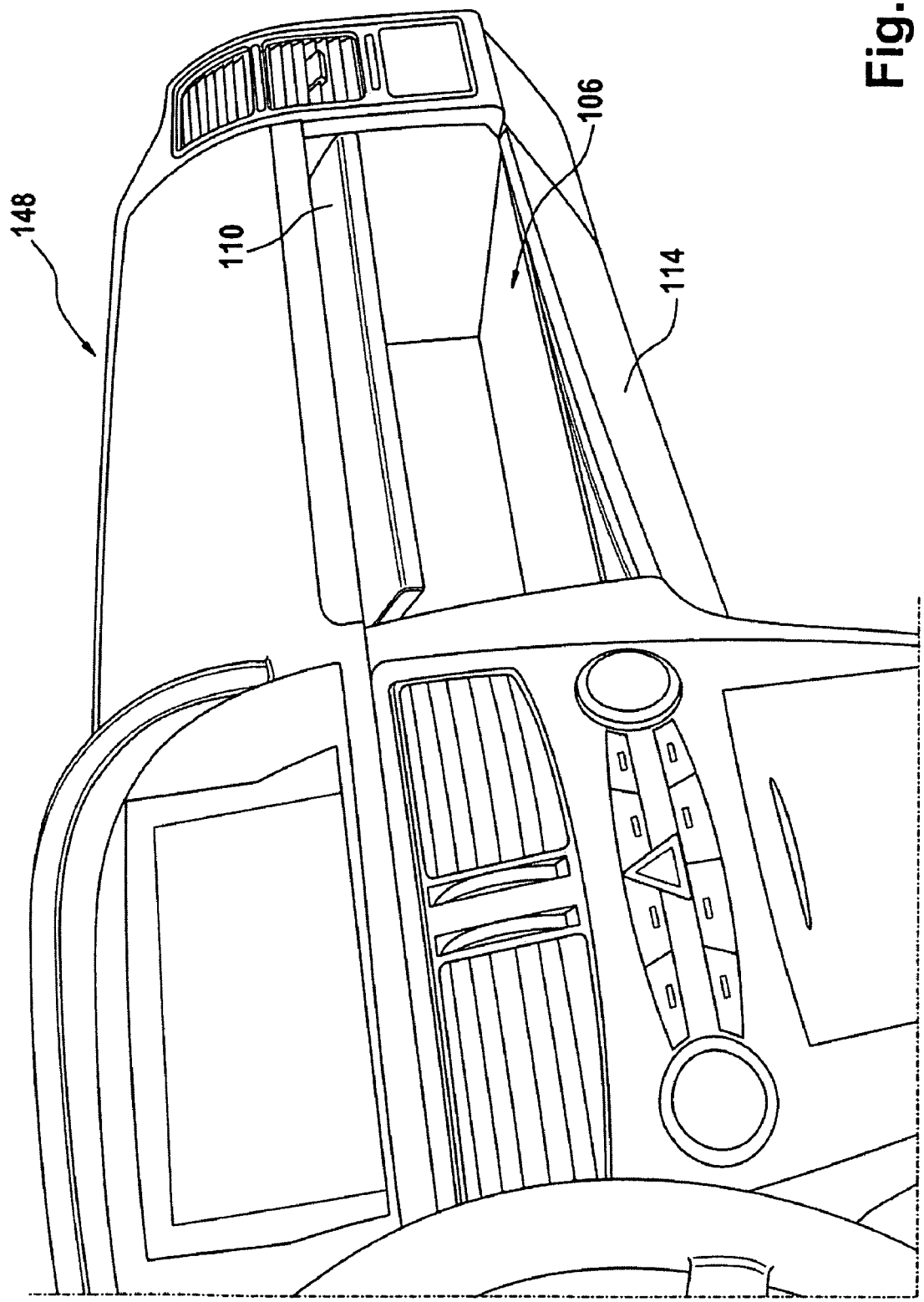

FIG. 7 shows the variant of the dashboard of FIG. 6 in perspective view for an opened upper cover 110. In this variant, the coupling 126 (cf. FIGS. 1, 2, and 3) between the covers 110 and 114 is not realized or kept, so that the cover 110 can open and close independent of the cover 114. For example, the coupling of the covers 110 and 114 is kept in such a way that the levers 128, 132, and 138 (cf. FIGS. 2 and 3) are not mounted.

Figure 8:
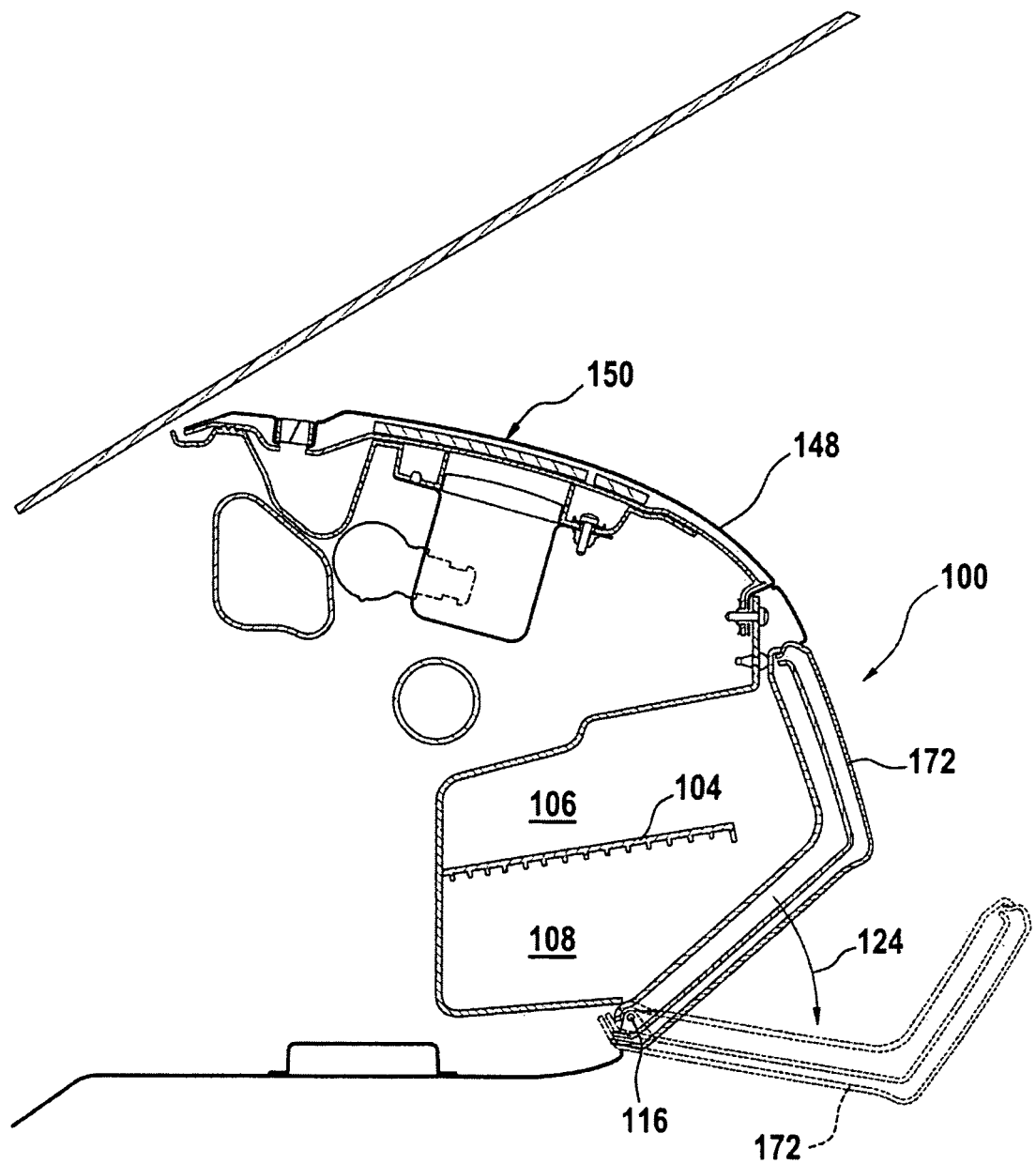

FIG. 8 shows another equipment variant of the embodiments of the dashboard 148 shown in FIGS. 4 to 7. In this equipment variant, the storage spaces 106 and 108 are concealed by a single cover 172, which can pivot about the lower axle 116. The cover 172 has essentially the same contour as the covers 110 and 114, when these are located in their closed position.

Figure 9:
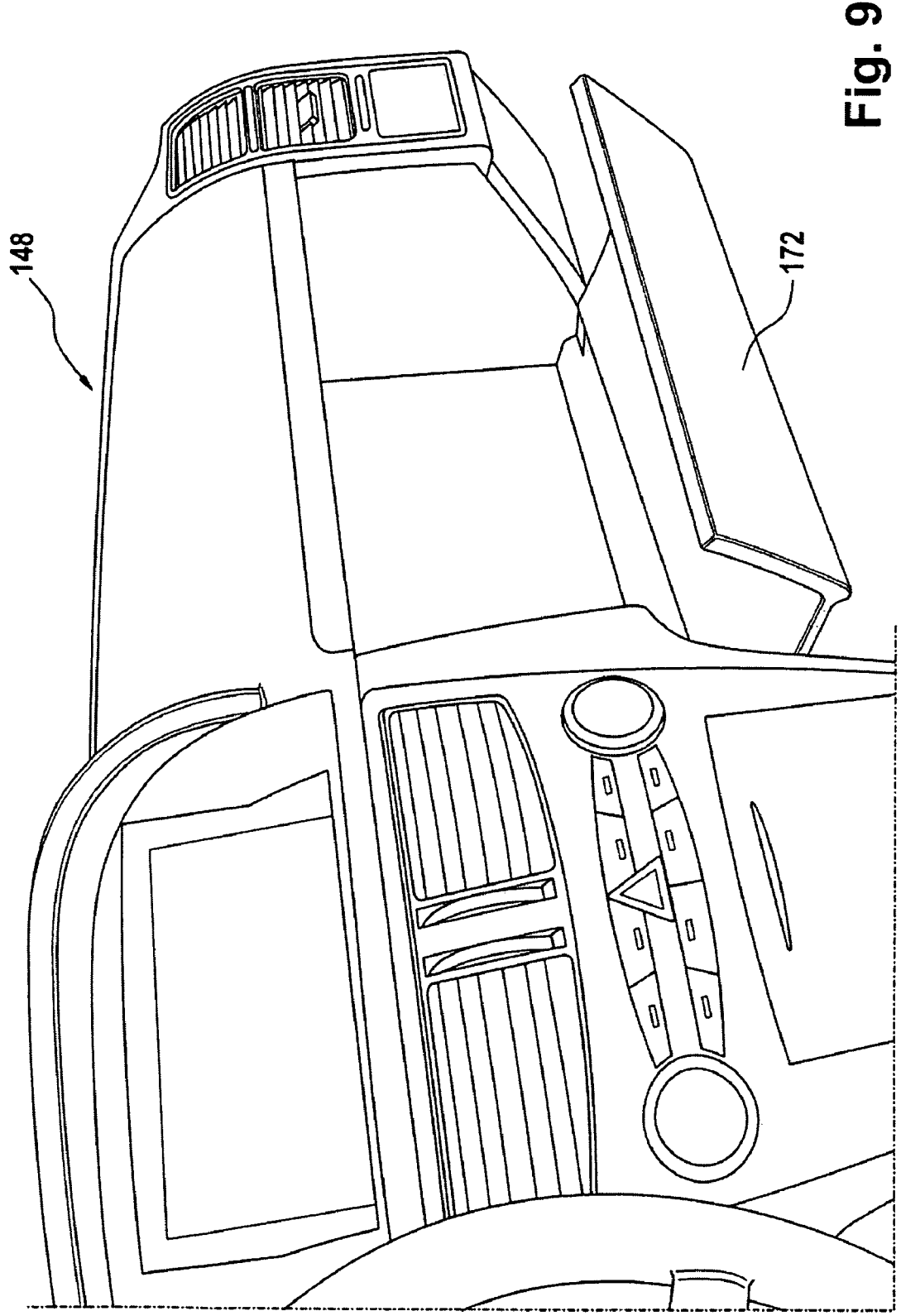

FIG. 9 shows a perspective view of another equipment variant, which corresponds essentially to the embodiment of FIG. 8, wherein the separating wall 104 is eliminated.

As shown with reference to FIGS. 4 to 9, a glove compartment system is created, which allows various equipment variants, wherein the outer appearance of the dashboard 148 remains essentially unchanged. Through modular construction, various equipment variants can be created economically according to customer wishes and according to the legal regulations existing in respective countries.

Figure 10:
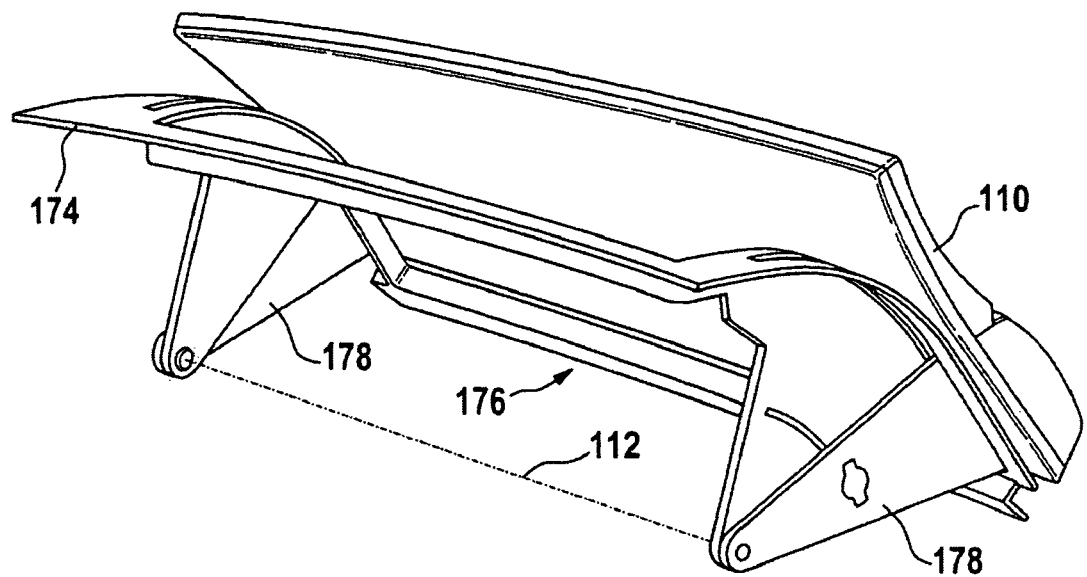

In a perspective view, FIG. 10 shows an attachment element 174, through which the storage space 106 (cf. FIG. 1 and FIGS. 4 to 8) is closed at the front. In the attachment element 174, an opening 176 is formed, through which the storage space 106 is accessible for an opened cover 110. By means of the attachment element 174, the cover 110 is mounted so that it can pivot, in that the attachment element 174 defines an axis 112, which runs in this embodiment approximately at the height of the separating wall 104 (cf. FIG. 1 and FIGS. 4 to 9). On the cover 110, side legs 178 are arranged, by means of which the cover 110 is connected to the axle 112. If the cover 110 is pivoted about the axle 112, it moves at least partially into the receiving region 168 (cf. FIGS. 4 and 6).

Figure 11:
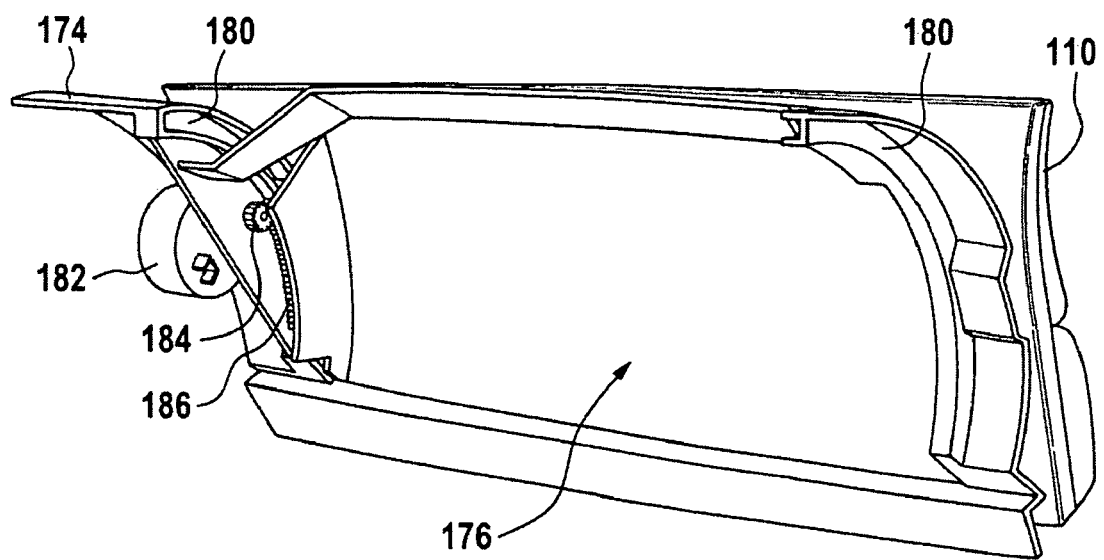

In a perspective view, FIG. 11 shows another embodiment of the attachment element 174. In the embodiment of FIG. 11, a connecting rod guide 180, along which the cover 110 can be opened and closed, is formed by the attachment element 174. In the embodiment considered here, the opening and closing motion of the cover is driven by an electric motor 182 by means of a gearwheel 184, which engages in gearing 186 arranged on the back side of the cover 110. Also in this embodiment, the cover 110 can be moved along the connecting rod guide 180 at least partially into the receiving region 168 (cf. FIGS. 4 and 6) for its opening motion.

The activation of the electric motor 182 takes place, for example, through the activation of a switch on the dashboard 148 (cf. FIGS. 4 to 9) and/or by activating the activation handle 122 (cf. FIGS. 1, 4, and 5).

Figure 12:
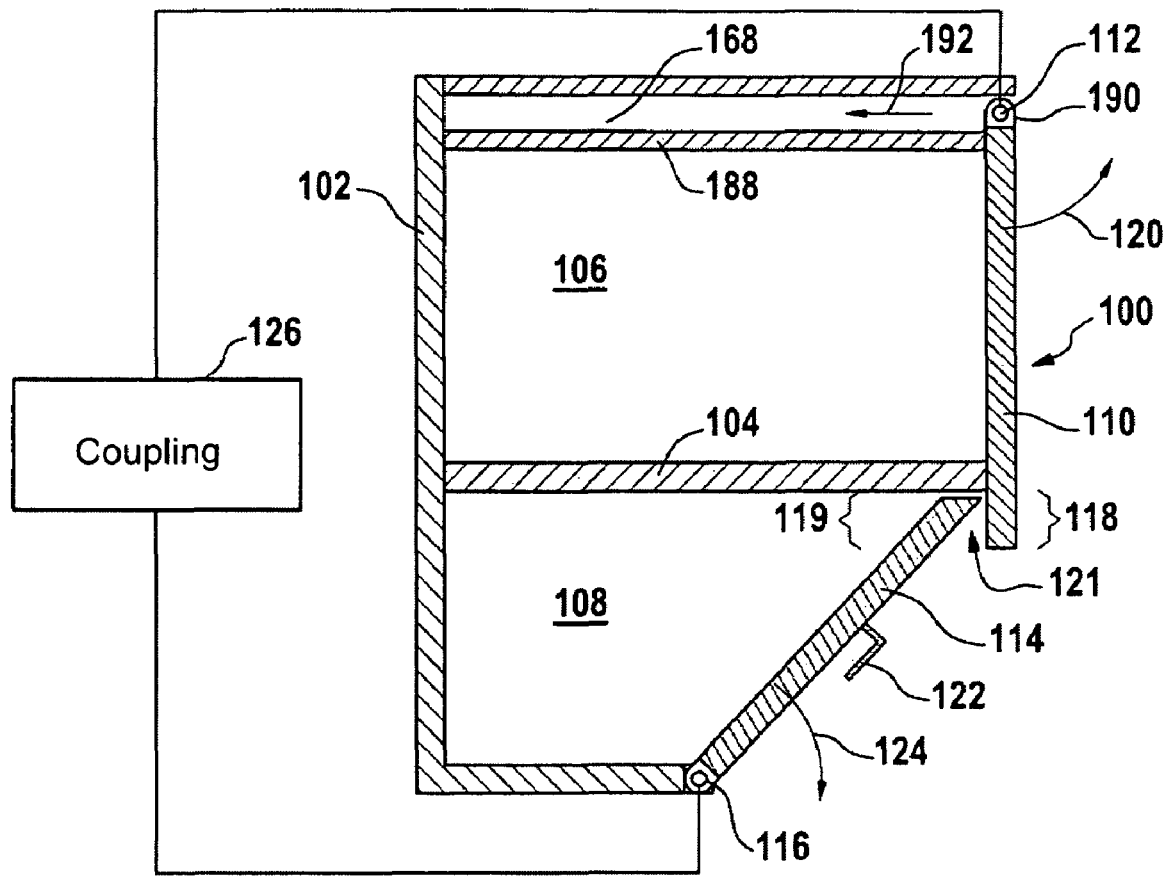

FIG. 12 shows another embodiment of a glove compartment 100 for a motor vehicle. The glove compartment 100 has a housing 102, which is divided by a separating wall 104 into an upper storage space 106 and a lower storage space 108. In the embodiment considered here, the separating wall 104 runs essentially in the horizontal direction in its installed position.

A glove compartment cover 110 is mounted on the housing 102 so that it can pivot upward about an axle 112. With the help of the connecting rod guide formed by the upper separating wall 188 and the connecting rod guide element 190, the glove compartment cover can be countersunk in the receiving region 168.

In its closed position shown in FIG. 3, the glove compartment cover 110 conceals the storage space 106.

Another glove compartment cover 114 of the glove compartment 100 is mounted on the housing 102 so that it can pivot downward about an axle 116. In its closed position shown in FIG. 3, the glove compartment cover 114 conceals the lower storage space 108.

In the embodiment considered here, the glove compartment cover 110 extends past the separating wall 104. Therefore, an edge region 118 is formed on the glove compartment cover 110. A user can easily grip the glove compartment cover 110 in the edge region 118 in order to pivot this upward in the pivoting direction 120. The edge region conceals the region 119 of the glove compartment cover 114, which lies behind viewed from the interior of the vehicle when the covers 110, 114 are closed and which forms a joint 121 with the other glove compartment cover 110.

The lower glove compartment cover 114 can have an activation handle 122. By pulling on the activation handle 122, a user can pivot the lower glove compartment cover 114 downward in the pivoting direction 124.

The two glove compartment covers 110 and 114 can be coupled with each other by means of a coupling 126, so that when one of the two glove compartment covers is opened, the other glove compartment cover is also opened. The coupling 126 can be constructed so that the same also applies for the closing of the glove compartment covers 110, 114, that is, when one of the glove compartment covers closes, the other glove compartment cover is automatically also closed at the same time.

The coupling 126 can be constructed here mechanically, e.g., by means of a lever mechanism, electromechanically, and/or electronically.

In the embodiment considered here, the coupling 126 is constructed in such a way that when the glove compartment covers 110, 114 close, the glove compartment cover 114 leads the glove compartment cover 110, so that the glove compartment cover 114 has reached its closed position shown in FIG. 12 before the glove compartment cover 110 reaches its closed position. In this way it is avoided that the glove compartment covers 110, 144 impact each other with their outer edges shortly before reaching their respective closed positions.

LIST OF REFERENCE SYMBOLS

100 Storage compartment
102 Housing
104 Separating wall
106 Storage space
108 Storage space
110 Cover
112 Axle
114 Cover
116 Axle
118 Edge region
120 Pivoting direction
121 Joint
122 Activation handle
124 Pivoting direction
126 Coupling
128 Lever
130 Axle
132 Lever
134 Axle
136 Region
138 Lever
140 Region
142 Stop face
144 Pivoting direction
146 Pivoting direction
148 Dashboard
150 Passenger airbag
152 Passenger
154 Passenger seat
158 Lower edge
160 Upper edge
162 Viewing direction
164 Wall
166 Boundary
168 Receiving region
170 Energy absorption body
172 Cover
174 Attachment element
176 Opening
178 Leg
180 Connecting rod guide
182 Electric motor
184 Gearwheel
186 Gearing

What is claimed is:

1. A glove compartment for a motor vehicle having a housing with a first storage space, which is separated from a second storage space, and with a first cover for concealing the first storage space and with a second cover for concealing the second storage space, wherein the first cover is arranged above the second cover with a joint there between, wherein the first cover can be countersunk at least partially into a dashboard, wherein the first and second covers are coupled with each other in such a way that when one of the covers is opened, the other cover is also opened, wherein the glove compartment has a first lever for mechanical coupling of the first and second covers and a second lever for mechanical coupling of the first cover with the first lever, wherein the first and second levers are connected to each other so that they can rotate, characterized in that:
the first cover is constructed in such a way that it conceals the joint between the first and second covers;
the second cover can pivot into an interior of the vehicle; and
the first lever is connected to the second cover and an axle of the first lever is supported by a third lever so that it can pivot with respect to the housing.

2. The glove compartment according to claim 1, wherein the first cover is constructed in such a way that when the glove compartment is located in its installed position in the motor vehicle, the joint is concealed when viewed from a sitting position on a passenger seat in the interior of the vehicle.

3. The glove compartment according to claim 2, wherein a lower edge of the first cover lies in front of an upper edge of the second cover when viewed from the sitting position.

4. The glove compartment according to claim 1, with a separating wall for separating the first and second storage spaces, wherein edge region of the first cover extends past the separating wall.

5. The glove compartment according to claim 1, wherein when in an installed position, the first storage space is arranged above the second storage space.

6. The glove compartment according to claim 1, wherein the first cover and the second cover are coupled with each other in such a way that when one of the covers is closed, the other is also closed.

7. The glove compartment according to claim 1, wherein only the second cover has an activation handle.

8. The glove compartment according to claim 1, wherein the second cover has an upper region, which is concealed when in an installed position by an edge region of the first cover when the covers are closed.

9. The glove compartment according to claim 1, wherein the coupling of the first and second covers is constructed mechanically, electromechanically, and/or electronically.

10. The glove compartment according to claim 1, with a receiving region for at least one section of the first cover.

11. The glove compartment according to claim 1, wherein the first cover is supported so that it can pivot.

12. The glove compartment according to claim 1, wherein a pivot axle of the third lever is arranged on the glove compartment housing.

13. The glove compartment according to claim 1, wherein the third lever has a stop face for limiting a pivoting motion of the first lever.

14. A dashboard with a glove compartment according to claim 1.

* * * * *